(12) United States Patent
Ahn et al.

(10) Patent No.: US 8,954,434 B2
(45) Date of Patent: Feb. 10, 2015

(54) ENHANCING A DOCUMENT WITH SUPPLEMENTAL INFORMATION FROM ANOTHER DOCUMENT

(75) Inventors: David Dongjah Ahn, San Francisco, CA (US); Michael Paul Bieniosek, San Mateo, CA (US); Franco Salvetti, San Francisco, CA (US); Giovanni Lorenzo Thione, San Francisco, CA (US); Ian Robert Collins, San Francisco, CA (US); Toby Takeo Sterrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 12/684,433

(22) Filed: Jan. 8, 2010

(65) Prior Publication Data

US 2011/0173210 A1  Jul. 14, 2011

(51) Int. Cl.
*G06F 17/30* (2006.01)

(52) U.S. Cl.
CPC .............................. *G06F 17/30616* (2013.01)
USPC ........... 707/737; 707/741; 707/748; 707/755; 707/756

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 4,939,689 A | * | 7/1990 | Davis et al. ............................ | 1/1 |
| 5,323,316 A | * | 6/1994 | Kadashevich et al. ............. | 704/9 |
| 5,369,577 A | * | 11/1994 | Kadashevich et al. ............. | 704/9 |
| 5,526,443 A | * | 6/1996 | Nakayama .................... | 382/229 |
| 5,544,360 A | * | 8/1996 | Lewak et al. .......................... | 1/1 |
| 5,598,557 A | * | 1/1997 | Doner et al. .......................... | 1/1 |
| 5,640,553 A | * | 6/1997 | Schultz .................................. | 1/1 |
| 5,778,363 A | * | 7/1998 | Light .................................... | 1/1 |
| 5,787,420 A | * | 7/1998 | Tukey et al. .......................... | 1/1 |
| 5,911,140 A | * | 6/1999 | Tukey et al. .......................... | 1/1 |
| 5,918,236 A | * | 6/1999 | Wical ............................. | 715/209 |
| 5,940,821 A | * | 8/1999 | Wical .................................... | 1/1 |
| 5,960,383 A | * | 9/1999 | Fleischer .......................... | 704/9 |
| 5,987,460 A | * | 11/1999 | Niwa et al. ............................ | 1/1 |
| 6,112,201 A | * | 8/2000 | Wical .................................... | 1/1 |
| 6,233,581 B1 | * | 5/2001 | Rambaud et al. ..................... | 1/1 |

(Continued)

OTHER PUBLICATIONS

Slawski, Bill, Google Timelines, Fact Maps, and Fact Relevance Rankings—Published Date: Aug. 3, 2007 http://www.seobythesea.com/?p=772.

(Continued)

*Primary Examiner* — Farhan Syed
(74) *Attorney, Agent, or Firm* — Dave Ream; Brian Haslam; Micky Minhas (57) ABSTRACT

The present technology is related to identifying, from within a corpus of documents, a subject (e.g., person, location, date, etc.) that is relevant to a topic and that is usable to enhance a topic-describing document. Documents within the corpus of documents share a link structure, such that some documents include hyperlinks that enable navigation to the topic-describing document, and the topic-describing document includes hyperlinks that enable navigation to other documents. Text of documents within the corpus is parsed to identify the subject, and a context of the subject suggests a degree of relevance of the subject to the topic. An enhancement type of the subject is determined, and a version of the topic-describing document is enhanced to include a presentation of the subject.

13 Claims, 9 Drawing Sheets

(56) References Cited

U.S. PATENT DOCUMENTS

| | | | |
|---|---|---|---|
| 6,397,209 B1* | 5/2002 | Reed et al. | 1/1 |
| 6,463,430 B1* | 10/2002 | Brady et al. | 1/1 |
| 6,775,677 B1* | 8/2004 | Ando et al. | 707/739 |
| 6,847,966 B1* | 1/2005 | Sommer et al. | 707/739 |
| 7,003,506 B1* | 2/2006 | Fisk et al. | 707/693 |
| 7,080,076 B1* | 7/2006 | Williamson et al. | 1/1 |
| 7,359,891 B2* | 4/2008 | Nishino et al. | 1/1 |
| 7,403,932 B2* | 7/2008 | Kao et al. | 706/45 |
| 7,412,463 B2* | 8/2008 | Mitchell et al. | 1/1 |
| 7,483,892 B1* | 1/2009 | Sommer et al. | 1/1 |
| 7,499,923 B2* | 3/2009 | Kawatani | 1/1 |
| 7,685,091 B2* | 3/2010 | Boone et al. | 707/737 |
| 7,962,469 B1* | 6/2011 | Hoelzle et al. | 707/708 |
| 8,150,831 B2* | 4/2012 | Zhang et al. | 707/708 |
| 8,291,319 B2* | 10/2012 | Li et al. | 715/709 |
| 8,495,490 B2* | 7/2013 | Acquaviva | 715/254 |
| 2003/0033333 A1* | 2/2003 | Nishino et al. | 707/531 |
| 2003/0120653 A1* | 6/2003 | Brady et al. | 707/7 |
| 2004/0024598 A1* | 2/2004 | Srivastava et al. | 704/235 |
| 2004/0230577 A1* | 11/2004 | Kawatani | 707/6 |
| 2005/0050145 A1* | 3/2005 | Lowe | 709/206 |
| 2005/0144179 A1* | 6/2005 | Maruhashi et al. | 707/100 |
| 2005/0216434 A1* | 9/2005 | Haveliwala et al. | 707/1 |
| 2005/0289447 A1* | 12/2005 | Hadley et al. | 715/501.1 |
| 2006/0041608 A1* | 2/2006 | Miller et al. | 707/205 |
| 2006/0059121 A1* | 3/2006 | Zhang et al. | 707/3 |
| 2007/0027672 A1 | 2/2007 | Decary | |
| 2007/0036135 A1* | 2/2007 | Patron et al. | 370/352 |
| 2007/0198459 A1* | 8/2007 | Boone et al. | 707/1 |
| 2008/0301120 A1 | 12/2008 | Zhu | |
| 2009/0063426 A1* | 3/2009 | Crouch et al. | 707/3 |
| 2009/0119255 A1 | 5/2009 | Frank | |
| 2009/0144255 A1* | 6/2009 | Chow et al. | 707/5 |
| 2010/0241618 A1* | 9/2010 | Beatty et al. | 707/679 |
| 2010/0268708 A1* | 10/2010 | Zhang et al. | 707/726 |
| 2011/0055699 A1* | 3/2011 | Li et al. | 715/709 |
| 2011/0087740 A1* | 4/2011 | Harpur et al. | 709/206 |
| 2011/0173210 A1* | 7/2011 | Ahn et al. | 707/748 |
| 2011/0307499 A1* | 12/2011 | Elias et al. | 707/750 |
| 2012/0185466 A1* | 7/2012 | Yamasaki et al. | 707/722 |

OTHER PUBLICATIONS

Lieberman, Michael D., et al., You are where you Edit: Locating Wikipedia Contributors through Edit Histories—Published Date: 2009, 22 pages, http://www.google.co.in/url?.

Geotagging—Published Date: Oct. 28, 2009 http://en.wikipedia.org/wiki/Geotagging.

Wikipedia:Obtaining Geographic Coordinates—Published Date: Nov. 5, 2009 http://en.wikipedia.org/wiki/Wikipedia:Obtaining_geographic_coordinates.

Overell, Simon E., et al, Geographic Co-occurrence as a Tool for GIR—Published Date: 2007 http://citeseerx.ist.psu.edu/viewdoc/download?doi=10.1.1.123.3540&rep=rep1&type=pdf.

Malovich, Jeffrey S., Using Data Extraction for GIS Database Population and Visualization—Retrieved Date: Nov. 13, 2009, http://proceedings.esri.com/library/userconf/proc96/to450/pap415/p415.htm.

Popescu, Adrian, et al., Creating Visual Summaries for Geographic Regions—Retrieved Date: Nov. 13, 2009 http://georama-project.labs.exalead.com/publication/popescu_kanellos_final.pdf.

* cited by examiner

ENHANCING A DOCUMENT WITH SUPPLEMENTAL INFORMATION FROM ANOTHER DOCUMENT

BACKGROUND

Documents (e.g., web pages) commonly describe a particular topic. However, the informative level of such topic-describing documents is often limited by the knowledge of the one or more individuals that create the documents. As such, subject matters that are related to a topic might not be included in a topic-describing document. Technology that assists with identifying subject matter that is relevant to a topic would be useful in the creation of topic-describing documents.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

The present technology is related to identifying, from within a corpus of documents, a subject that is relevant to a topic and that is usable to enhance a topic-describing document. Documents within the corpus of documents share a link structure, such that some documents include hyperlinks that enable navigation to the topic-describing document, and the topic-describing document includes hyperlinks that enable navigation to other documents. Text of documents within the corpus is parsed to identify the subject, and a context of the subject suggests a degree of relevance of the subject to the topic. An enhancement type of the subject is determined, and a version of the topic-describing document is enhanced to include a presentation of the subject.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Figure 2:
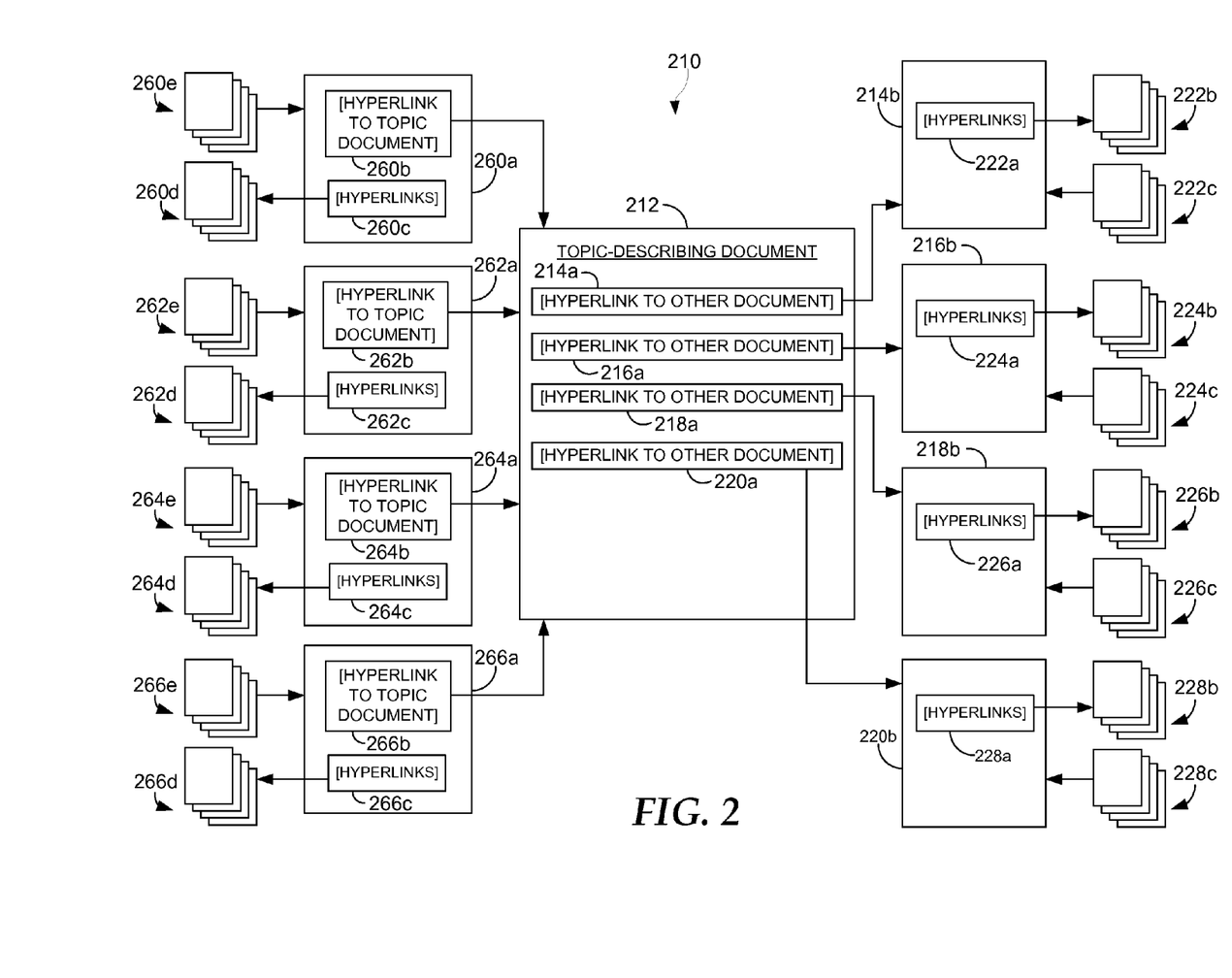
FIG. 2 is a block diagram of an exemplary corpus of documents in accordance with an embodiment of the present invention.

Generally, embodiments of our technology are directed to automatically and accurately extracting, from a corpus of documents, supplemental information that is usable to enhance a document. In an embodiment of the present invention, the corpus of documents includes a set of documents (e.g., web pages) that are integrated using hyperlinks, which, when input, enable navigation from one document of the corpus to another document within the corpus. Referring briefly to FIG. 2, an exemplary corpus of documents is depicted and identified generally by reference numeral 210. In an embodiment of the present invention, documents within the corpus of documents are reference documents that describe a particular topic. For example, the corpus of documents might comprise an encyclopedia of documents, such that each document within the corpus is an encyclopedic reference document. Other corpuses might include a dictionary and/or a thesaurus, such that each document describes a topic (i.e., word) within the dictionary and/or thesaurus.

One embodiment of the present invention includes one or more computer-readable media having computer-executable instructions embodied thereon that, when executed on a computing device, cause the computing device to perform a method of identifying, from within a corpus of documents, a subject that is relevant to a topic and that is usable to enhance a topic-describing document. Pursuant to the method, the topic-describing document and a linked document are retrieved, wherein a hyperlink is embedded within text of a linked document that, when input, enables navigation to the topic-describing document. Text of the linked document is parsed to identify the subject, wherein a context of the subject suggests a degree of relevance of the subject to the topic. The method further includes determining an enhancement type of the subject, wherein an enhancement type is a category of supplemental information that is usable to enhance a first version of the topic-describing document. The first version of the topic-describing document is transformed into an enhanced version of the topic-describing document, wherein the enhanced version includes a presentation of the subject. The enhanced version is stored to be presented at runtime.

Another embodiment includes a system, which includes a processor and a computer readable medium, that identifies, from within a corpus of documents, a subject that is relevant to a topic and that is usable to enhance a topic-describing document. The system includes a document retriever that retrieves a first set of documents and a second set of documents. Each document of the first set of documents includes a respective in-hyperlink that, when input, navigates to the topic-describing document. Each document of the second set of documents is referenced by a respective out-hyperlink that is embedded in text of the topic-describing document. The system also includes a parser that parses text of the topic-describing document, text of the first set of documents, and text of the second set of documents to generate a set of potentially relevant subjects. The system further includes a subject evaluator that applies a rule to a respective context of each potentially relevant subject, wherein application of the rule identifies a relevant subject that is relevant to the topic. An enhancement-type identifier of the system determines an enhancement type of the relevant subject, wherein an enhancement type is a category of supplemental information that is usable to enhance the topic-describing document. Furthermore, a document enhancer of the system transforms a first version of the topic-describing document into an enhanced version of the topic-describing document, which includes a presentation of the relevant subject.

A further embodiment of our technology includes a computer-implemented method, which is executed using a processor and computer readable media, of identifying, from within a corpus of documents, a subject that is relevant to a topic and that is usable to enhance a topic-describing document. The method includes retrieving the topic-describing document and a linked document, wherein a hyperlink is embedded within text of the linked document that, when input, enables navigation to the topic-describing document. The method also includes grammatically parsing text of the linked document to identify a subject, wherein a grammatical context of the subject suggests a relevance of the subject to the topic. Moreover, a date-page hyperlink is identified that forms at least part of the grammatical context of the subject and that navigates to a date-describing reference document, which suggests that the subject is of temporal significance. The method further includes transforming the first version of the topic-describing document into an enhanced version, which includes a timeline that indicates the temporal significance of the subject and storing the enhanced version to be presented at runtime.

Figure 1:
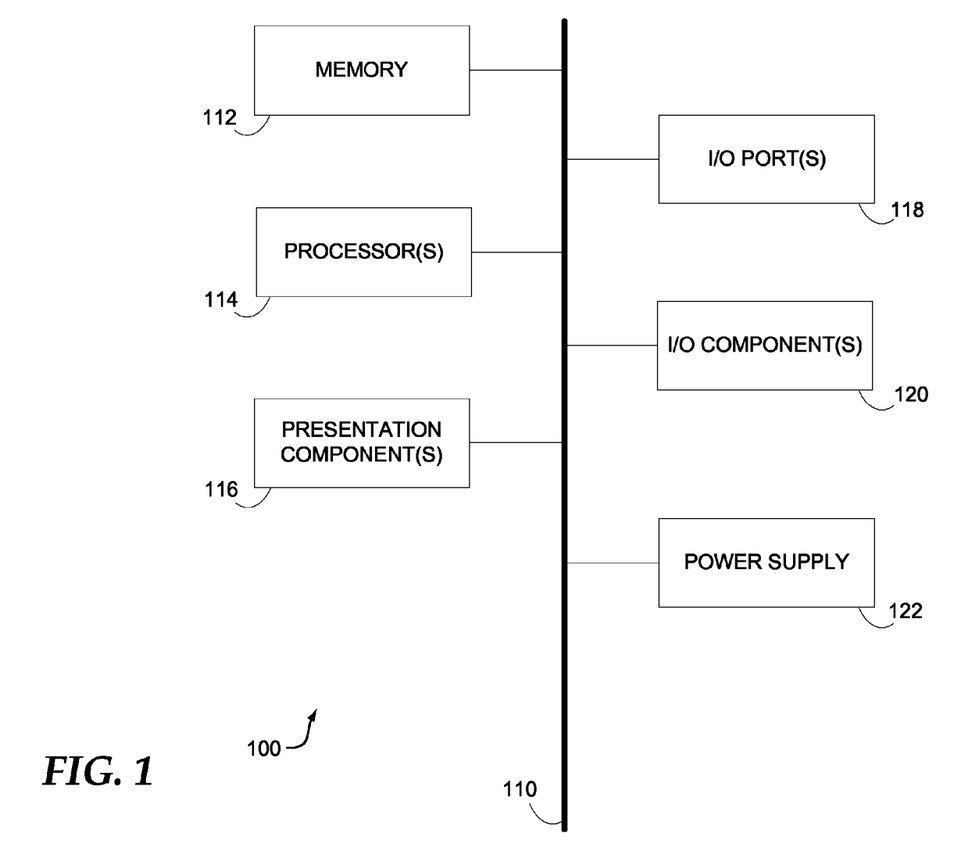
FIG. 1 is a block diagram depicting an exemplary computing device suitable for use in accordance with embodiments of the invention.

Having briefly described embodiments of the present invention, we refer now to FIG. 1 in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention might be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Embodiments of the present invention might be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to FIG. 2, corpus of documents 210 will be described in more detail. Corpus of documents 210 includes a topic-describing document 212. As previously indicated, topic-describing document 212 might include a reference document (e.g., encyclopedia reference document, dictionary reference document, etc.) that provides information about a particular topic. In one embodiment, topic-describing document 212 is a web page that is part of an encyclopedia of web pages that describes a collection of topics. Topic-describing document 212 includes hyperlinks 214*a*, 216*a*, 218*a*, and 220*a*, each of which provides a link to a respective document 214*b*, 216*b*, 218*b*, and 220*b*, which is also included in corpus of documents 210. Hyperlinks 214*a*, 216*a*, 218*a*, and 220*a* might be referred to herein as "out-hyperlinks" of topic-describing document 212 because, when input into a computing device, hyperlinks 214a, 216a, 218a, and 220a enable navigation "out" of topic-describing document 212. Each of documents 214b, 216b, 218b, and 220b describe a respective topic and, similar to topic-describing document, might be a reference document (e.g., encyclopedic web page). Documents 214b, 216b, 218b, and 220b also include hyperlinks 222a, 224a, 226a, and 228a that, when input, enable navigation to respective documents 222b, 224b, 226b, and 228b. Moreover, each of documents 214b, 216b, 218b, and 220b are referenced in other documents 222c, 224c, 226c, and 228c of corpus of documents 210. That is, each of documents 222c, 224c, 226c, and 228c include hyperlinks that enable navigation to respective document 214b, 216b, 218b, and 220b.

Figure 3A:
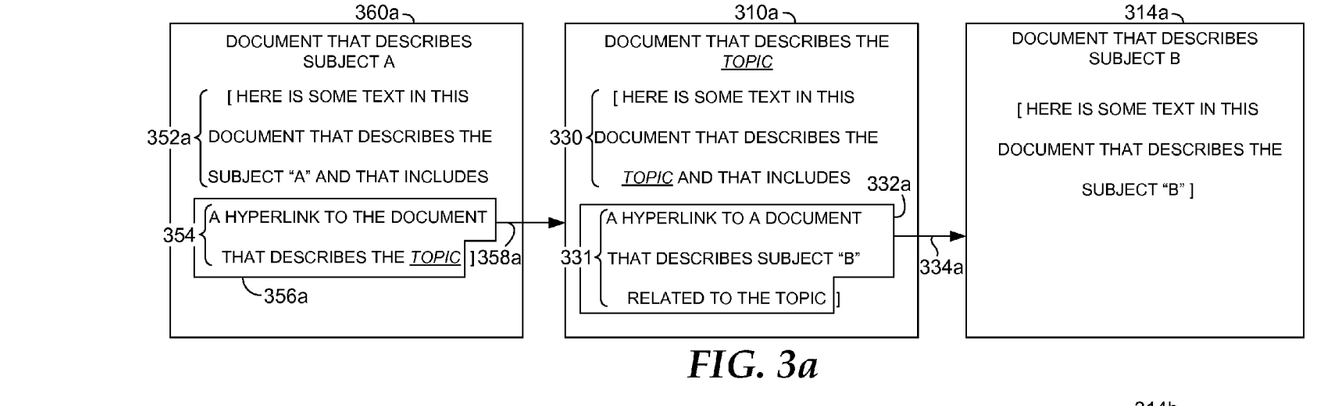
FIGS. 3a and 3b are block diagrams that depict a relationship between documents in accordance with an embodiment of the present invention.
Figure 3B:
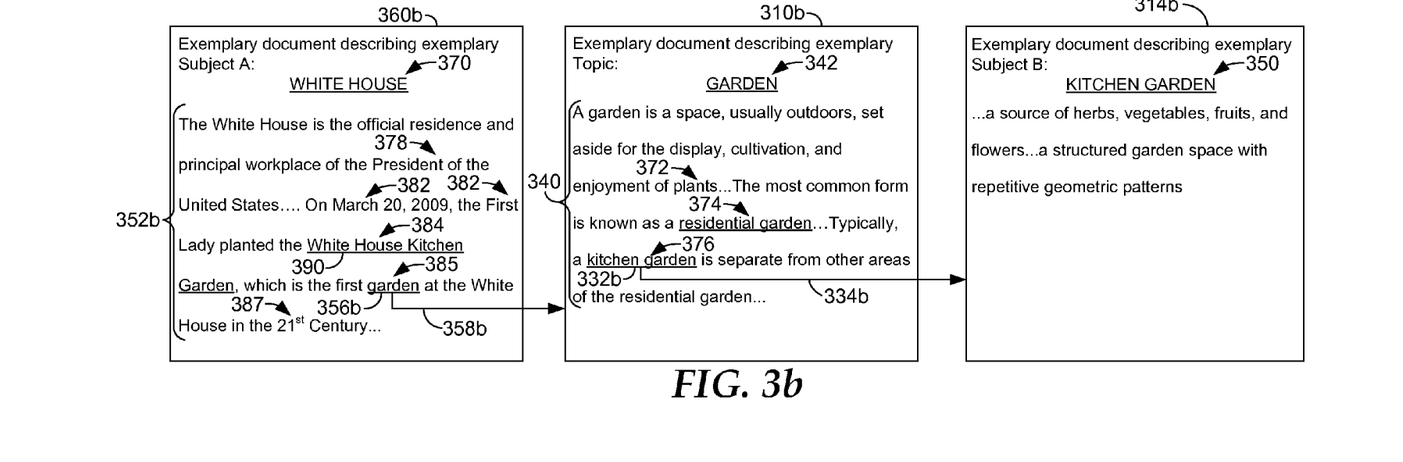

FIGS. 3a and 3b depict an illustrative relationship between a topic-describing document and another document within a common corpus of documents. In FIG. 3a, text 330 indicates that topic-describing document 310a includes information about a topic. Moreover, text 331 indicates that topic-describing document 310a includes a hyperlink 332a to document 314a. For example, arrow 334a indicates that, when input (e.g., input into a browser by clicking with an input device) hyperlink 332a enables navigation to document 314a. FIG. 3b depicts exemplary text that might be found in documents within a corpus of documents. Topic-describing document 310b includes information 340 about the topic 342 "Garden." Moreover, topic-describing document 310b includes a hyperlink 332b. Arrow 334b indicates that, when input, hyperlink 332b enables navigation to document 314b, which includes information that describes the topic 350 "Kitchen Garden."

The terms "topic" and "subject" are used throughout this Description. "Topic" refers to a primary subject of a document (e.g., reference document). That is, a topic is a primary subject that is described by a document. For example, in FIG. 3b topics include "White House," 370 "Garden," 342 and "Kitchen Garden" 350. On the other hand, "subject" refers to subject matter that might be relevant to a topic. For example, in FIG. 3b, subjects of the topic "Garden" 342 include plants 372, residential garden 374, and kitchen garden 376 and subjects of the topic "White House" include President of the United States 378, Mar. 20, 2009 380, First Lady 382, and White House Kitchen Garden 384. A subject might also be a topic, and a topic might also be a subject. For example, kitchen garden 376 is a subject of garden and is also a topic (indicated by reference numeral 350). However, a topic is not necessarily a subject, and a subject is not necessarily a topic.

Returning to FIG. 2, corpus of documents 210 also includes documents 260a, 262a, 264a, and 266a, each of which includes a respective hyperlink 260b, 262b, 264b, and 266b to topic-describing document 212. Each of hyperlinks 260b, 262b, 264b, and 266b enable navigation to topic-describing document 212. Hyperlinks 260b, 262b, 264b, and 266b might be referred to herein as "in-hyperlinks" of topic-describing document 212 because hyperlinks 260b, 262b, 264b, and 266b enable navigation "into" topic-describing document 212. Each of documents 260a, 262a, 264a, and 266a also include respective hyperlinks 260c, 262c, 264c, and 266c to other documents 260d, 262d, 264d, and 266d of corpus of documents 210. Moreover, corpus of documents 210 includes documents 260e, 262e, 264e, and 266e, each of which includes a hyperlink to respective document 260a, 262a, 264a, and 266a. Corpus of documents 210 is depicted in FIG. 2 for illustrative purposes. In other embodiments, a corpus of documents might be larger or smaller, but still includes a link structure through which a document of the corpus is linked to one or more other documents of the corpus.

Returning to FIGS. 3a and 3b, an exemplary relationship is depicted between a topic-describing document and a document that includes a hyperlink, which enables navigation to the topic-describing document. In FIG. 3a, text 352a indicates that document 360a includes information that describes subject "A" and text 354 indicates that document 360a includes a hyperlink 356a. Arrow 358a indicates that, when input, hyperlink 356a enables navigation to topic-describing document 310a. FIG. 3b depicts exemplary text that might be found in documents within a corpus of documents. As described above, topic-describing document 310b includes information 340 about the topic 342 "Garden." Moreover, document 360b includes information 352b that describes the topic 370 "White House." Document 360b includes a hyperlink 356b. Arrow 358b indicates that, when input, hyperlink 356b enables navigation to topic describing document 310b.

In embodiments of the present invention, documents within the corpus of documents include metadata. As such, in FIG. 3b, document 360b might include metadata that describes or is otherwise associated with text 352b. For example, metadata of the text "White House" and/or "White House Kitchen Garden" might include location information (e.g., geo-coordinates) of each of these geographic locations.

Figure 4:
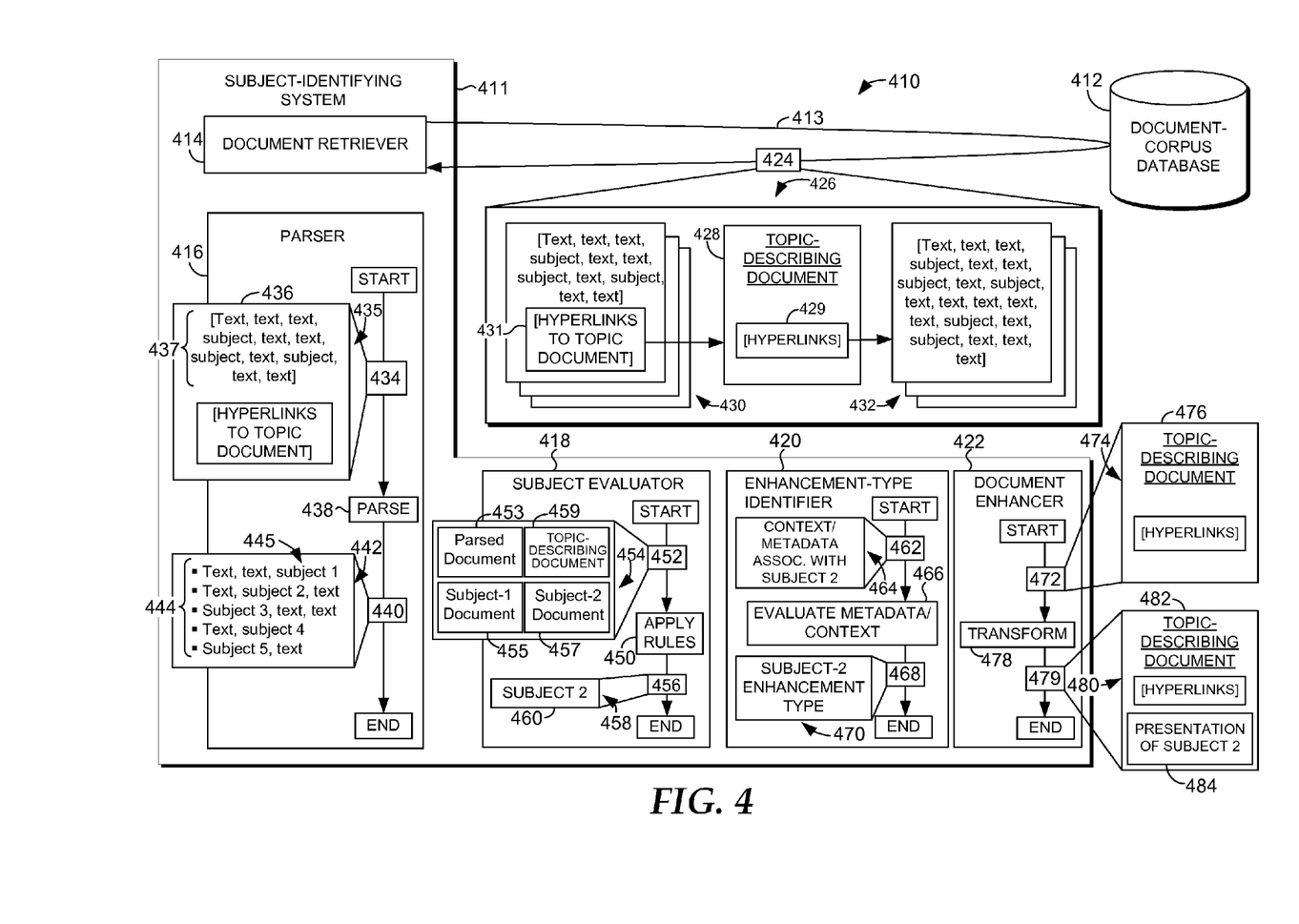
FIG. 4 is a block diagram of an exemplary system in accordance with an embodiment of the present invention.
Figure 9:
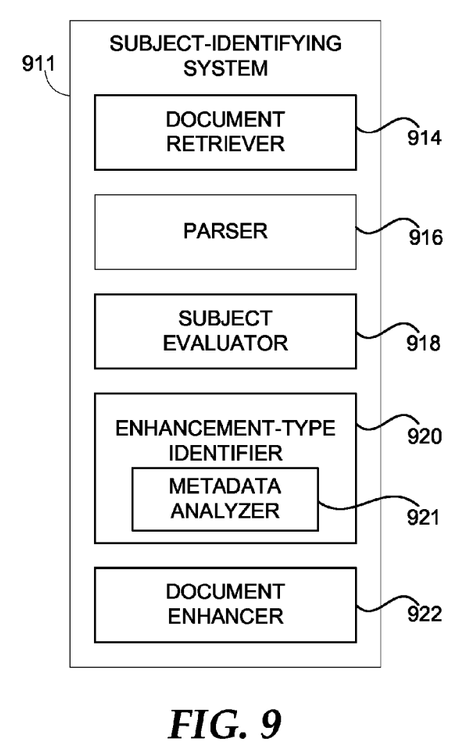
FIG. 9 depicts a block diagram of an exemplary system in accordance with an embodiment of the present invention.

Referring now to FIG. 4, a system in accordance with an embodiment of the present invention is depicted and is referenced generally by the numeral 410. System 410 includes a document-corpus database 412, a document retriever 414, a parser 416, a subject evaluator 418, an enhancement-type identifier 420, and a document enhancer 422. Referring briefly to FIG. 9, a simpler block diagram also depicts a system 911 in accordance with an embodiment of the present invention. That is, subject-identifying system 911 includes a document retriever 914, a parser 916, a subject evaluator 918, an enhancement-type identifier 920, a metadata analyzer 921, and a document enhancer 922. As described herein, the components of FIG. 4 correspond to the components of FIG. 9.

Components of system 410 might be combined in a single component (e.g., single processing component) or might alternatively be independent components. Moreover, although each component is depicted singularly, each component might include a plurality of components. In one embodiment, document retriever 414, parser 416, subject evaluator 418, enhancement-type identifier 420, and document enhancer 422 comprise a subject-identifying system 411. In an alternative embodiment, document-corpus database 412 is also included in subject-identifying system 411. Generally, document retriever 414 retrieves documents from document-corpus database 412. Text of the documents is parsed by parser 416 to identify subjects that might relate to a topic. Subject evaluator 418 applies a set of rules to identified subjects to determine whether a subject is relevant to the topic. Enhancement-type identifier 420 determines an enhancement type of the relevant subject, and based on the enhancement type, document enhancer 422 generates an enhanced document.

More specifically, in an embodiment of the present invention, a topic-describing document is accessed. For example, document retriever 414 retrieves data 424 from document-corpus database 412. Arrow 413 depicts a retrieval process, such as a request for data 424 and a response to the request. For illustrative purposes an exploded view 426 of data 424 is depicted. Exploded view 426 includes documents that were retrieved from document-corpus database 412 and that include a topic-describing document 428. Documents within exploded view 426 also include documents 430, which include in-hyperlinks 431 that enable navigation to topic-describing document 428, and documents 432, which might be navigated to using out-hyperlinks 429. Referring back to FIG. 3b to describe an exemplary embodiment, a topic-describing document (i.e., document 428 of FIG. 4) that is retrieved includes topic-describing document 310b, which describes the topic "Garden" 342. Further, a document with an in-hyperlink that is retrieved (i.e., documents 430 of FIG. 4) includes document 360b, and a document accessible using an out-hyperlink (i.e., documents 432 of FIG. 4) includes document 314b.

In a further embodiment of the present invention, parser 416 parses text or HTML of documents that are retrieved in order to identify subjects that might be relevant to a topic. In one embodiment a parser 416 includes a component that analyzes free text or HTML to identify a defined target among the free text or HTML. For example, the parser might be configured to identify references to a topic. In another embodiment, parser 416 might grammatically parse text or HTML in order to associate each word of the text with a formal grammar type (e.g., subject noun, object noun, verb, etc.). By determining a grammar type of each word, potentially relevant subjects can be identified. For example, parser 416 might be configured such that each noun that is a subject, and that is in the same sentence as a topic, is identified as a potentially relevant subject. Parser 416 might be configured more specifically such that a subject noun is only identified as potentially relevant if it is within a predetermined number of words from the topic, which is also included within the text. These are only meant to be examples of parsing and parser 416 might be configured to apply any parsing rules so desired.

FIG. 4 depicts parsing 438 of input 434, which is shown in an exploded view 435 for illustrative purposes. Exploded view 435 depicts a document 436, which might be a document of documents 430 that were retrieved by document retriever 414. Accordingly, parser 416 parses 438 input 434, thereby generating output 440, which is shown in an exploded view 442 for illustrative purposes. Exploded view 442 depicts a list 444 of potentially relevant subjects that have been parsed together with accompanying text. The list 444 is comprised of elements that are included within text 437 of document 436. Referring back to FIG. 3b to describe an exemplary embodiment, an input (i.e., input 434 of FIG. 4) might include any and/or all of text from documents 360b, 310b, and 314b. If input includes text 352b of document 360b, text 352b will be parsed to generate an output. Accordingly, output might include the subjects President of the United States 378, Mar. 20, 2009 382, First Lady 382, White House Kitchen Garden 384, garden 385, and 21$^{st}$ Century 387. As described above, these identified subjects might have been identified based on each subject's grammar type, location with respect to the topic, and/or any other parsing rule that might be applied. Moreover, output of a parser might include accompanying text of each of these identified subjects. Exemplary accompanying text of the subject the White House Kitchen Garden 384 might include "first garden at the White House in the 21$^{st}$ Century." Input (i.e., input 434 of FIG. 4) might similarly include text 340 of document 310b or text of document 314b. Although for illustrative purposes, a limited number of documents are shown that might be parsed, in other embodiments, all documents of a corpus of documents, or any subset of documents of a corpus of documents, are parsed to identify subjects that are potentially relevant to a topic.

Referring to FIG. 4, in an embodiment of the present invention, once a subject is identified, such as by parser 416, the subject is represented within system 410 by a document (e.g., reference document) that is from within the corpus of documents and that describes the subject. For example, once subject 1 445 is identified by parser 416, subject 1 is represented by a subject-1 document 455 that is from within the corpus of documents and that describes subject 1. Subject-1 document 455 that is representative of subject 1 might treat subject 1 as the primary topic of the document; however, the document might alternatively treat subject 1 as a sub-topic. In such an embodiment, a corpus of linked documents is leveraged to identify a subject and locate a linked document that describes the subject. Referring to FIG. 3b for exemplary purposes, once White House Kitchen Garden 384 is identified as a subject, White House Kitchen Garden 384 might be represented (e.g., such as in system 410 of FIG. 4) by a document that is referenced by the White House Kitchen Garden hyperlink 390. (Hyperlink 390 is depicted by underlined text of FIG. 3b.)

In another embodiment of the present invention, subject evaluator 418 evaluates subjects to determine a degree of relevancy to a topic. For example, subject evaluator 418 might evaluate subjects that are identified by parser 416. FIG. 4 indicates that rules are applied 450 to an input 452, which is shown in an exploded view 454 for illustrative purposes. Exploded view 454 depicts exemplary documents that might be considered when evaluating subject 1 and subject 2. For example, input 452 might include, within text of parsed document 453 (e.g., text of document 436 that was parsed by parser 416), each subject and its respective accompanying text identified by parser 416 (i.e., list 444). Moreover, as described above, each of subject 1 and subject 2 are represented in exploded view 454 by a respective document. As previously indicated, subject 1 is represented by subject-1 document 455. Subject 2 is represented by subject-2 document 457. Furthermore, subject evaluator 418 might utilize a topic-describing document 459 to determine a degree of relevancy of a subject to a topic. For example, topic-describing document 459 might be topic-describing document 428 that was retrieved by document retriever 414. Subject evaluator 418 applies rules 450 to input 452 to generate an output 456, which is shown in an exploded view 458 for illustrative purposes. Exploded view 458 depicts an exemplary output of "Subject 2" 460 based on exemplary subjects 455, thereby indicating that based on the rules that were applied, Subject 2 460 is a subject that is deemed to be relevant to the topic.

In embodiments of the present invention, rules applied by subject evaluator 418 include any rules that help to determine a degree of relevancy of a subject to a topic. One class of rules applied by the subject evaluator 418 might include information-retrieval (IR) rules. Exemplary IR rules include term frequency/inverse document frequency (TF/IDF) in which a term is evaluated based on both the frequency of the term within a corpus of documents and the frequency of the term within a particular document. For example, subject 2 might be evaluated based on both the frequency of subject 2 within documents of document-corpus database 412 and frequency within topic-describing document 459. Other rules might be semantically based. For example, a rule might state that a subject is only deemed to be relevant if the subject is used as one of a specified types of grammar (e.g., subject noun). Referring back to FIG. 3b to describe an exemplary embodiment, subjects to be evaluated to determine a degree of relevancy to the topic "Garden" 342, might include President of the United States 378, Mar. 20, 2009 382, First Lady 382, White House Kitchen Garden 384, and 21$^{st}$ Century 387. As such, upon application of rules to these identified subjects, White House Kitchen Garden 384 might be deemed to have a desired degree of relevancy to the topic garden. For example, based on IR rules, White House Kitchen Garden 384 might have a desirable TF/IDF value. Moreover, semantic rules might be applied to assess the text surrounding White House Kitchen Garden 384 (i.e., assess "first garden at the White House in the 21$^{st}$ Century") and deem that based on this surrounding text, White House Kitchen Garden 384 possesses a desired degree of relevancy to the topic "garden." For example, semantic rules might dictate that in a string of text, when a topic (e.g., garden) is modified by "first," the subject noun (e.g., White House Kitchen Garden) will be deemed relevant to the topic (i.e., the object noun).

The parser 416 and the subject evaluator 418 are described herein as separate components for explanatory purposes. However, in other embodiments, the functionalities of the parser 416 and subject evaluator 418 might be combined into a single component, such that an input might include text of a document and an output includes a parsed subject that has been deemed to have a desired degree of relevancy to a topic.

In a further embodiment of the present invention, enhancement-type identifier 420 determines an enhancement type of a subject. For example, enhancement-type identifier 420 might determine an enhancement type of a subject that is deemed to be relevant by subject evaluator 418. As used herein, "enhancement type" is a category of supplemental information that is usable to enhance a topic-describing document. For example, a topic-describing document might fail to describe various categories of information that are relevant to a topic, such that these categories of information might be used in a supplemental fashion to enhance the topic-describing document. Exemplary categories include people, places, things, and dates, such that each of these categories of information might comprises an enhancement type. That is, an enhancement type includes any category of supplemental information that is usable to enhance a topic-describing document, and examples of enhancement types include people, geographic locations, things, and dates.

As depicted in FIG. 4, enhancement-type identifier 420 processes an input 462, which is shown in exploded view 464 for exemplary purposes. Exploded view 464 depicts that input 462 might include context and/or metadata that is associated with a subject (e.g., subject 2 that was deemed to be relevant by subject evaluator 418). Context and metadata are available to be evaluated by enhancement-type identifier 420 because subjects are represented in system 410 by one or more documents of the corpus. For example, relevant context and metadata of subject 2 are available by referencing each of parsed document 453, topic-describing document 459, and subject-2 document 457. Each of these documents is retrievable by system 410 using the link structure that is built into the corpus of documents. As described in more detail below, enhancement-type identifier 462 evaluates 466 the metadata and/or context to generate an output 468, which is shown in exploded view 470 for illustrative purposes. Exploded view 470 illustrates that output 470 indicates an enhancement type of subject 2.

In further embodiments, enhancement-type identifier 420 determines an enhancement type of a subject using various methods and/or sub-components. In one embodiment, enhancement-type identifier 420 includes a metadata analyzer, which analyzes metadata that is associated with a subject. Referring briefly to FIG. 9, a metadata analyzer 921 is depicted as a component of an enhancement-type identifier 920. A metadata analyzer functions in various manners. For example, subject-2 document 457 that describes subject 2 might have associated with subject-2 document 457 a set of metadata. Some types of metadata provide location information of a geographically significant subject, such as the latitude and longitude of a location of the subject. Accordingly, once the metadata analyzer reads metadata of a document and discovers location information of the subject, enhancement-type identifier 420 determines that the subject is a geographically significant enhancement type.

Referring back to FIG. 3b to describe an exemplary embodiment, White House Kitchen Garden 384 might have been deemed relevant to garden 385. As such, metadata associated with White House Kitchen Garden 384 might be analyzed using various approaches. For example, the present invention might determine, based on analysis of the text 352b that the White House Kitchen Garden is a place at the White House, thereby suggesting that the White House Kitchen Garden possesses geographical significance. In that case, metadata of document 360b is analyzed to discover location information (e.g., geo-coordinate metadata) of the White House, which is imputed to the White House Kitchen Garden. Having discovered a geographical significance of the White House Kitchen Garden, the White House Kitchen Garden is deemed to be a geographically significant enhancement type. An alternative method of determining an enhancement type might not rely on metadata of document 360b. Instead, text 352b depicts that White House Kitchen Garden 384 is hyperlinked (i.e., via hyperlink 390) to its own topic-describing document (not shown), which describes the White House Kitchen Garden as a topic. As such, metadata of the White House Kitchen Garden's own topic-describing document might be analyzed to discover location information (e.g., geo-coordinate metadata) of the White House Kitchen Garden. Again, by discovering metadata that indicates a geographical location of the White House Kitchen Garden, the White House Kitchen Garden can be deemed to be a geographically significant enhancement type.

In another embodiment, the enhancement-type identifier 420 evaluates context of a subject to identify indications of a particular enhancement type. For example, enhancement-type identifier 420 might evaluate text of a document (e.g., topic-describing document 459, subject-2 document 457, and/or parsed document 453) to identify indications that a subject (e.g., subject 2) is a person, a location, and/or temporally significant. In one embodiment, enhancement-type identifier 420 identifies within text of a document, which describes a subject, a date-page hyperlink that forms at least part of the context of the subject. As used herein a "date-page hyperlink" is a hyperlink that, when input, enables navigation to a document (e.g., date-describing reference document) that describes a date, such as by describing events that occurred on the date. A date-describing reference document is another type of document that is included within document-corpus database 412 and that is retrievable by document retriever 414.

Referring to FIGS. 3b and 4 to describe an exemplary embodiment, White House Kitchen Garden 384 might have been deemed relevant to garden 385. As such, enhancement-type identifier 420 might evaluate text 352b to determine a context of White House Kitchen Garden 384. For example, the context might include that "On Mar. 20, 2009, the First Lady planted the White House Kitchen Garden, which is the first garden at the White House in the 21$^{st}$ Century." Based on this context, the enhancement-type identifier 420 might identify the date "Mar. 20, 2009" and "first . . . in the 20 Century" and determine that the White House Kitchen Garden is temporally significant. In another embodiment, the enhancement-type identifier 420 might also reference a topic-describing document (not shown) that can be navigated to using the "White House Kitchen Garden" hyperlink 390. In this case, the enhancement-type identifier 420 might evaluate text of the "White House Kitchen Garden" topic-describing document to discover any dates that suggest that the White House Kitchen Garden is temporally significant. In such an embodiment, the "White House Kitchen Garden" topic-describing document provides another source of context. By discovering context of White House Kitchen Garden that indicates a temporal significance of the White House Kitchen Garden, the enhancement-type identifier 420 can deem the White House Kitchen Garden to be a temporally significant enhancement type.

During identification of an enhancement type, a date might be discovered that is presented as a date-page hyperlink. As such, the evaluation by enhancement-type identifier 420 might further include referencing (i.e., further leveraging the link structure of the corpus of documents) a date-describing reference document (not shown) that is accessible using the date-page hyperlink to determine if the subject is listed as an event on the date-describing reference document. A listing on the date-describing reference document that includes the subject further suggests that the subject is temporally significant. Again, when a subject is deemed to be temporally significant, enhancement-type identifier 420 determines that the subject is a temporally significant enhancement type.

In a further embodiment, document enhancer 422 transforms a version of a topic-describing document into an enhanced version of the topic-describing document. The enhanced version includes a presentation of a subject that was deemed by subject evaluator 418 to have a sufficient relevancy to the topic. Moreover, the presentation is generated based on the subject enhancement type as identified by the enhancement-type identifier 420. FIG. 4 depicts processing by document enhancer 422 of an input 472, which is shown in an exploded view 474 for illustrative purposes. Exploded view 474 depicts a version of a topic-describing document 476 that does not include a presentation of subject 2. In one embodiment, the version of the topic-describing document 476 was retrieved by the document retriever (e.g., document 428). Document enhancer 422 transforms 478 input 472 into an output 479, which includes an enhanced version of the topic-describing document. For example, exploded view 480 depicts enhanced version 482, which includes a presentation of subject 2 484.

Figure 5A:
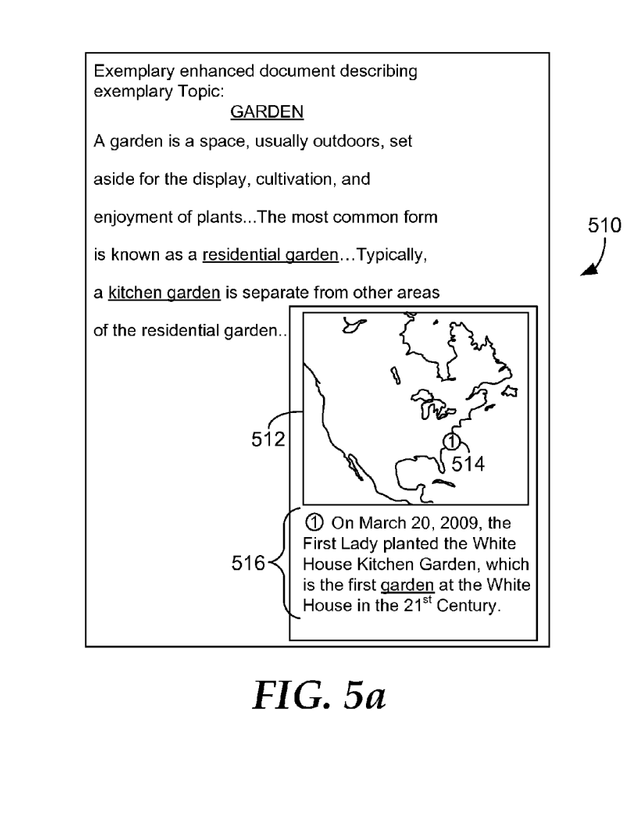
FIGS. 5a and 5b are exemplary enhanced documents in accordance with an embodiment of the present invention.

Referring to FIGS. 3b, 4, and 5 to describe an exemplary embodiment, topic-describing document 310b might be considered a non-enhanced version. After processing by parser 416, subject evaluator 418, and enhancement-type identifier 420, system 410 determines that White House Kitchen Garden is a relevant subject to the topic "garden" and that White House Kitchen Garden is a geographically significant enhancement type. Document enhancer 422 transforms document 310b to include a presentation of White House Kitchen Garden. For example, FIG. 5a depicts an exemplary enhanced version 510 of the topic-describing document. Enhanced version 510 includes a map 512 that depicts a geographic location 514 of the White House Kitchen Garden. Moreover, enhanced version 510 includes a description of the White House Kitchen Garden.

Figure 5B:
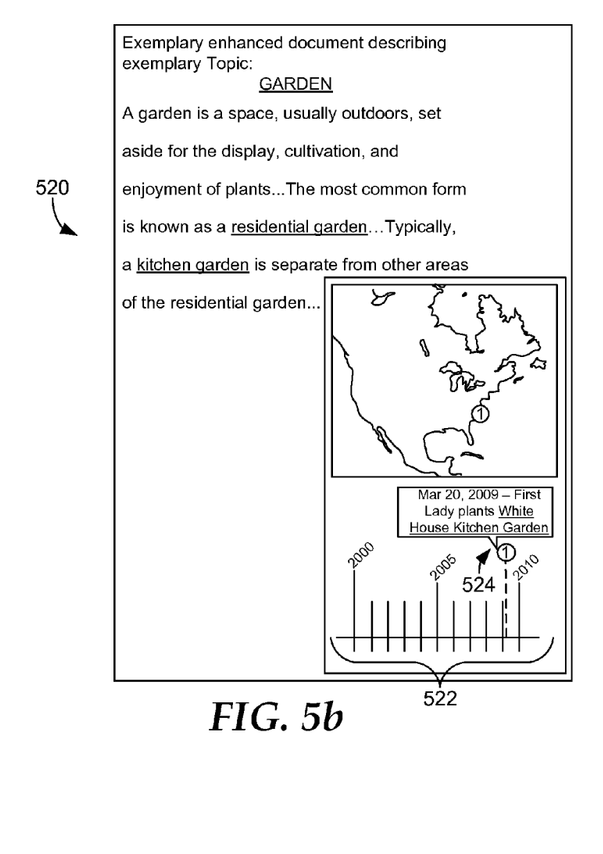

In an alternative exemplary embodiment, White House Kitchen Garden is determined to be temporally significant as it relates to the topic "garden." As such, FIG. 5b depicts another enhanced version 520 of the topic-describing document. Enhanced version 520 depicts a timeline 522, which includes an indication 524 of the temporal significance of the White House Kitchen Garden.

In a further embodiment of the present invention, identification of a topic-relevant subject and enhancement of a topic-describing document is executed in connection with a search engine. For example, a third party (i.e., a party that does not operate the search engine) might maintain a corpus of documents (e.g., collection of encyclopedic web pages) that share a link structure. Accordingly, a document from within the third-party corpus of documents might be retrievable by the search engine as a search result. However, the document that is retrievable might not include an enhanced version of the document, such that the document fails to present a subject that is relevant to a topic of the document. As such, it is desirable that the search engine retrieve the non-enhanced version of the document, identify a topic-relevant subject, and enhance the document, so that the search engine provide the enhanced version as a search result.

Figure 8:
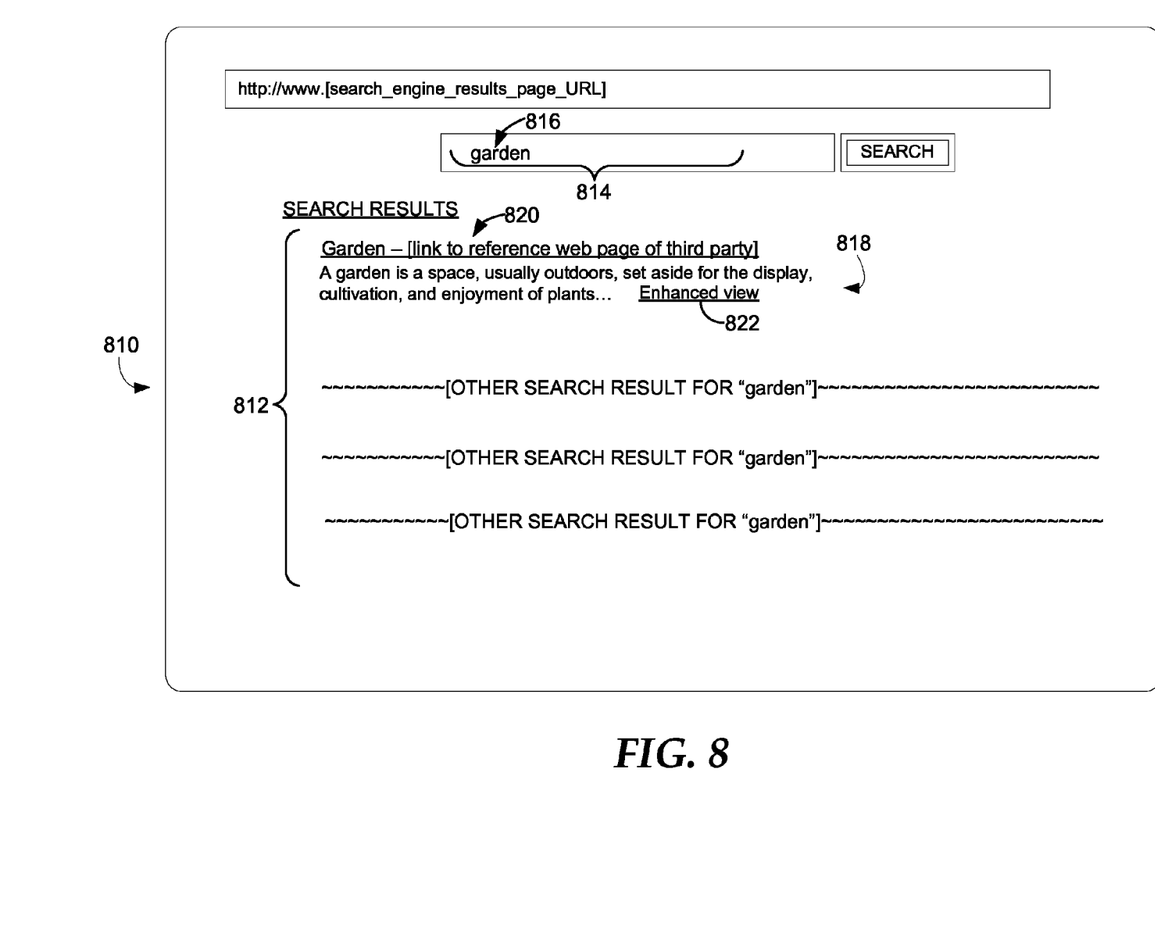
FIG. 8 depicts an exemplary screenshot in accordance with an embodiment of the present invention.

Referring to FIG. 8, an exemplary screenshot 810 depicts search results 812 that might be presented in response to a search query 814, which includes the term "garden" 816. A first search result 818 provides a link 820 to a web page of a third party. An exemplary web page of a third party includes topic-describing document 476 of FIG. 4. That is, the reference document that is presented at the web page of the third party does not include an enhanced version that includes identified topic-relevant subject matter. In an embodiment of the present invention, also presented as part of search result 818 is a link 822 to an enhanced version of the reference web page. Exemplary enhanced versions of the reference web page include topic-describing document 484 of FIG. 4, document 510 of FIG. 5a, and document 520 of FIG. 5b.

In a further embodiment of the present invention, a topic-describing document, which is maintained in a collection compiled by a third party, is retrieved and enhanced offline in accordance with the above description. Moreover, an enhanced version is stored to be presented at runtime, which includes in response to a search query that causes the topic-describing document to be identified as a search result.

Figure 6:
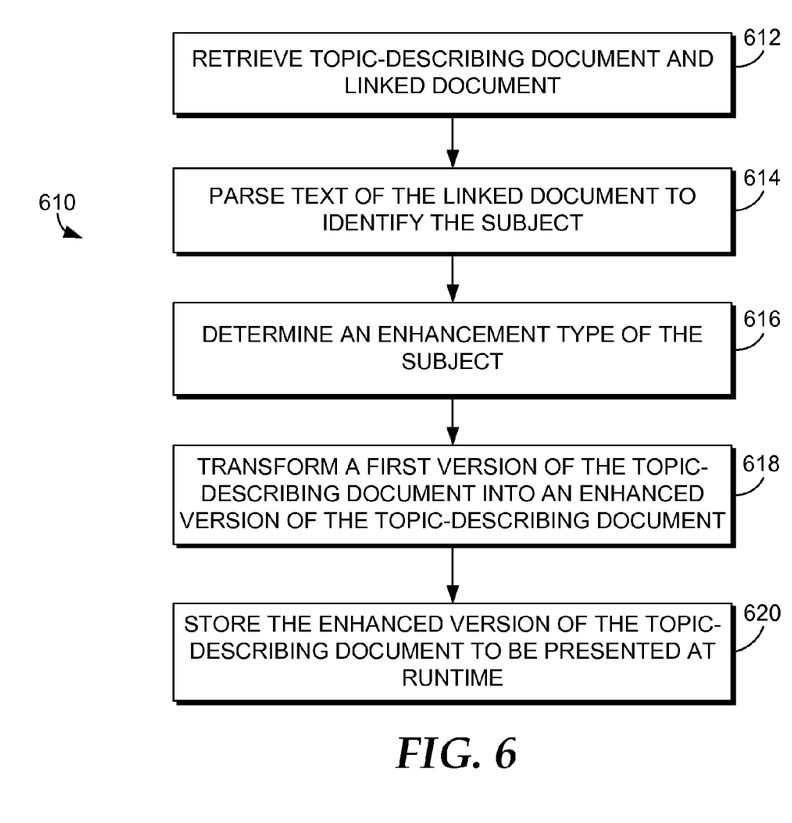
FIGS. 6 and 7 are flow diagrams of exemplary methods in accordance with an embodiment of the present invention.

One embodiment of the present invention is directed to one or more computer-readable media having computer-executable instructions embodied thereon that, when executed on a computing device, cause the computing device to perform a method of identifying, from within a corpus of documents, a subject that is relevant to a topic and that is usable to enhance a topic-describing document. FIG. 6 depicts a flow diagram that includes steps of the method 610. The method 610 includes at step 612, retrieving the topic-describing document and a linked document, wherein a hyperlink is embedded within text of the linked document that, when input, enables navigation to the topic-describing document. Step 614 includes parsing text of the linked document to identify the subject, wherein a context of the subject suggests a degree of relevance of the subject to the topic. At step 616, an enhancement type of the subject is determined, wherein an enhancement type is a category of supplemental information that is usable to enhance the topic-describing document. Step 618 includes transforming a first version of the topic-describing document into an enhanced version of the topic-describing document, wherein the enhanced version includes a presentation of the subject. At step 620, the enhanced version of the topic-describing document is stored to be presented at runtime.

Figure 7:
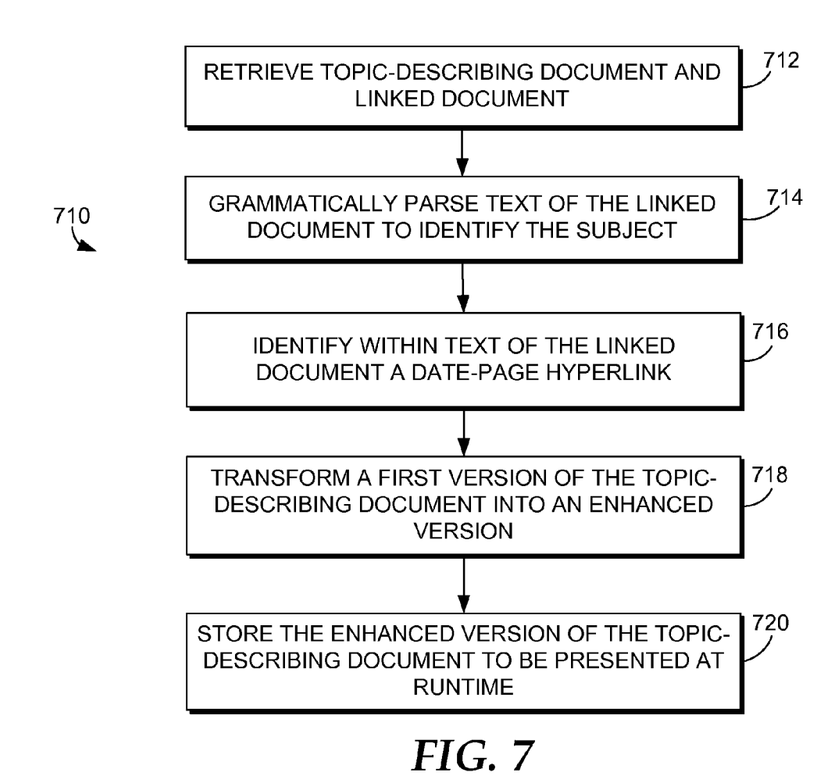

Another embodiment of the present invention is directed to a computer-implemented method, which is executed using a processor and computer readable media, of identifying, from within a corpus of documents, a subject that is relevant to a topic and that is usable to enhance a topic-describing document. FIG. 7 includes a flow diagram that shows steps of the method 710, which includes at step 712 retrieving the topic-describing document and a linked document, wherein a hyperlink is embedded within text of the linked document that, when input, enables navigation to the topic-describing document. Step 714 includes grammatically parsing text of the linked document to identify the subject, wherein a grammatical context of the subject suggests a degree of relevance of the subject to the topic. Method 710 also includes at step 716 identifying within text of the linked document a date-page hyperlink that forms at least part of the grammatical context of the subject and that navigates to a date-describing reference document, which suggests that the subject is of temporal significance. At step 718, a first version of the topic-describing document is transformed into an enhanced version, which includes a timeline that indicates the temporal significance of the subject. Step 720 includes storing the enhanced version of the topic-describing document to be presented at runtime.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-storage media storing computer-executable instructions that, when executed by a computing device, cause the computing device to perform a method of identifying, from within a corpus of documents, a subject that is relevant to a topic and that is usable to enhance a topic-describing document, the method comprising:
retrieving the topic-describing document that describes the topic and a linked document that is hyperlinked to the topic-describing document and that describes a subject;
parsing text of the linked document to identify the subject and to identify within the text of the linked document a data-page hyperlink that is associated with a date relevant to the subject and that navigates to a date-describing reference document;
storing an association between the subject and the linked document, wherein the association enables retrieval of the linked document;
determining that the subject in the linked document is relevant to the topic described by the topic-describing document by applying a set of one or more rules to at least content of the linked document and content of the topic-describing document, wherein a grammatical context of the subject in the linked document suggests a degree of relevance of the subject to the topic;
utilizing an association between the subject and the linked document to retrieve the linked document when the subject represented by the linked document is deemed to be relevant to the topic described by the topic-describing document;
analyzing metadata of the linked document that was retrieved to identify temporally significant information and location information of the subject;
using the temporally significant information and the location information of the subject that was obtained from the metadata of the linked document to generate a timeline and a map depicting a geographic location of the subject; and
transforming a first version of the topic-describing document into an enhanced version of the topic-describing document by inserting the timeline and the map into the first version.

2. The computer-storage media of claim 1, wherein the topic-describing document and the linked document are reference documents within a collection of hyperlinked documents.

3. The computer-storage media of claim 1, wherein the metadata includes geo-coordinates of a location of the subject.

4. The computer-storage media of claim 1 further comprising, extracting content from the linked document that was retrieved and adding the content to the map to describe the subject, wherein the map included in the enhanced version of the topic-describing document includes content extracted from the linked document.

5. The computer-storage media of claim 1, wherein the timeline depicts an indication of the date that is associated with the subject.

6. The computer-storage media of claim 1, wherein a rule of the set of one or more rules is applied to a context of the subject to determine that the degree of relevance of the subject to the topic satisfies a relevance threshold.

7. The computer-storage media of claim 1, wherein another hyperlink is embedded within text of the linked document that, when input, enables navigation to another document that describes the subject.

8. The computer-storage media of claim 7, wherein the method further comprises: referencing the third document to disambiguate the subject.

9. A system, which includes a processor and computer-storage media, that identifies, from within a corpus of documents, a subject that is relevant to a topic and that is usable to enhance a topic-describing document, the system comprising:
a document retriever that leverages a processor coupled with a computer-memory device to retrieve a first set of documents from a datastore, each document of the first set of documents including a respective in-hyperlink that, when input, navigates to the topic-describing document, and a second set of documents, each of which is referenced by a respective out-hyperlink that is embedded in text of the topic-describing document;
a parser that leverages the processor to parse text or HTML of the topic-describing document, text or HTML of the first set of documents, text or HTML of the second set of documents, or a combination thereof, to generate a set of potentially relevant subjects, wherein a respective link is stored that links each potentially relevant subject with a respective document;
a subject evaluator that applies a rule to a respective context of each potentially relevant subject, wherein application of the rule identifies a relevant subject that is relevant to the topic, and wherein a link stored in association with the relevant subject is used to retrieve a document describing the relevant subject;
an enhancement-type identifier that parses the document to identify within text of the document a data-page hyperlink that is associated with a date relevant to the subject and that navigates to a date-describing reference document wherein the date relevant to the subject is used to generate a timeline depicting a temporal significance relevant to the subject; and
a document enhancer that transforms a first version of the topic-describing document into an enhanced version of the topic-describing document by adding the timeline to the topic-describing document.

10. The system of claim 9, wherein the relevant subject is geographically significant.

11. The system of claim 9, wherein the enhancement-type identifier includes a metadata analyzer that evaluates metadata associated with the relevant subject to determine the enhancement type of the relevant subject.

12. The system of claim 9, wherein the enhanced version includes a map presenting an indication of a geographic location of the subject and wherein the content extracted from the document is added to the map.

13. A computer-implemented method of identifying, from within a corpus of documents, a subject that is relevant to a topic and that is usable to enhance a topic-describing document, the method comprising:

retrieving the topic-describing document and a linked document, wherein a hyperlink is embedded within text of the linked document that, when input, enables navigation to the topic-describing document;

grammatically parsing text of the linked document to identify the subject;

determining that the subject in the linked document is relevant to the topic described by the topic-describing document by applying a set of one or more rules to at least content of the linked document and content of the topic-describing document, wherein a grammatical context of the subject suggests a degree of relevance of the subject to the topic;

storing an association between the subject and the linked document to represent the subject using the linked document, wherein the association enables retrieval of the linked document;

utilizing the association to retrieve the linked document when the subject represented by the linked document is deemed to be relevant to the topic described by the topic-describing document;

identifying within text of the linked document a date-page hyperlink that forms at least part of the grammatical context of the subject and that navigates to a date-describing reference document, which suggests that the subject is of temporal significance;

using the temporal significance of the subject that was obtained from the date-describing reference document to generate a timeline indicating the temporal significance of the subject; and transforming a first version of the topic-describing document into an enhanced version by inserting the timeline into the topic-describing document.

* * * * *